(12) United States Patent
Destefanis et al.

(10) Patent No.: US 12,483,417 B2
(45) Date of Patent: Nov. 25, 2025

(54) COMPUTER-IMPLEMENTED SYSTEM AND METHOD ENABLING SECURE STORAGE OF A LARGE BLOCKCHAIN OVER A PLURALITY OF STORAGE NODES

(71) Applicant: nChain Licensing AG, Zug (CH)

(72) Inventors: Giuseppe Destefanis, London (GB); Simone Madeo, London (GB); Patrick Motylinski, London (GB); Stephane Vincent, Luxembourg (LU); Craig Steven Wright, London (GB)

(73) Assignee: NCHAIN LICENSING AG, Zug (CH)

( * ) Notice: Subject to any disclaimer, the term of this patent is extended or adjusted under 35 U.S.C. 154(b) by 0 days.

(21) Appl. No.: 16/634,085

(22) PCT Filed: Jul. 16, 2018

(86) PCT No.: PCT/IB2018/055237
§ 371 (c)(1),
(2) Date: Jan. 24, 2020

(87) PCT Pub. No.: WO2019/021106
PCT Pub. Date: Jan. 31, 2019

(65) Prior Publication Data
US 2020/0213125 A1    Jul. 2, 2020

(30) Foreign Application Priority Data

Jul. 24, 2017    (GB) ..................................... 1711867

(51) Int. Cl.
*H04L 29/06*    (2006.01)
*G06F 9/30*    (2018.01)
(Continued)

(52) U.S. Cl.
CPC ........ *H04L 9/3239* (2013.01); *G06F 9/30029* (2013.01); *G06Q 20/00* (2013.01);
(Continued)

(58) Field of Classification Search
None
See application file for complete search history.

(56) References Cited

U.S. PATENT DOCUMENTS 10,762,506 B1 * 9/2020 Cash .................... G06Q 20/206
2012/0307765 A1   12/2012 Chakrabarti et al.
(Continued)

FOREIGN PATENT DOCUMENTS

| JP | 7065887 B2 | 5/2022 | |
| WO | 2017036546 A1 | 3/2017 | |
| WO | WO-2017136956 A1 * | 8/2017 | ............. G06F 16/27 |

OTHER PUBLICATIONS

Antonopoulos, "Mastering Bitcoin—Unlocking Digital Cryptocurrencies," O'Reilly Media, Inc., Dec. 20, 2014, 282 pages.
(Continued)

*Primary Examiner* — Bassam A Noaman
*Assistant Examiner* — Hassan A Hussein
(74) *Attorney, Agent, or Firm* — Tarolli, Sundheim, Covell & Tummino LLP

(57) ABSTRACT

A protocol is described which: (i) allows storage nodes to be rewarded for maintaining a public blockchain; and (ii) verifies the integrity of the blockchain with the help of a Proof-of-Blockchain Storage (PoBS) scheme. The protocol provides a way to cryptographically check if a data file stored on a remote server is intact using a challenge-response method. The protocol is secured against a man-in-the-middle attack. A malicious peer cannot pass the challenge to a third party which is storing the data and give back the response. The scheme is also publicly verifiable.

16 Claims, 3 Drawing Sheets

(51) Int. Cl.
 *G06Q 20/00* (2012.01)
 *H04L 9/32* (2006.01)
 *H04L 9/40* (2022.01)
 *H04L 9/00* (2022.01)

(52) U.S. Cl.
 CPC .......... *H04L 9/3247* (2013.01); *H04L 9/3271* (2013.01); *H04L 9/3297* (2013.01); *H04L 63/10* (2013.01); *H04L 9/50* (2022.05)

(56) References Cited

U.S. PATENT DOCUMENTS

| | | | |
|---|---|---|---|
| 2015/0269624 A1* | 9/2015 | Cheng | G06Q 30/0261 705/14.58 |
| 2015/0294308 A1 | 10/2015 | Pauker et al. | |
| 2015/0363772 A1* | 12/2015 | Ronca | G06Q 20/3829 705/71 |
| 2016/0140596 A1* | 5/2016 | Green | G06Q 30/0226 705/14.27 |
| 2016/0358169 A1* | 12/2016 | Androulaki | G06Q 20/401 |
| 2017/0126684 A1 | 5/2017 | Armknecht et al. | |
| 2017/0140408 A1 | 5/2017 | Wuehler | |
| 2017/0180128 A1 | 6/2017 | Lu | |
| 2017/0236120 A1* | 8/2017 | Herlihy | G06Q 20/065 705/67 |
| 2017/0257358 A1* | 9/2017 | Ebrahimi | H04L 9/3236 |
| 2017/0317997 A1* | 11/2017 | Smith | H04L 9/3247 |
| 2018/0109541 A1* | 4/2018 | Gleichauf | H04W 12/06 |
| 2018/0165476 A1* | 6/2018 | Carey | H04L 9/3247 |
| 2018/0189781 A1* | 7/2018 | McCann | G06Q 20/202 |
| 2018/0253702 A1* | 9/2018 | Dowding | H04L 63/123 |
| 2018/0276597 A1* | 9/2018 | Fuller | G06K 7/12 |
| 2018/0276666 A1* | 9/2018 | Haldenby | H04L 9/3268 |
| 2018/0330386 A1* | 11/2018 | Kim | H04L 63/0823 |
| 2018/0336552 A1* | 11/2018 | Bohli | H04L 9/3297 |
| 2018/0337769 A1* | 11/2018 | Gleichauf | G06Q 20/0655 |
| 2018/0343111 A1* | 11/2018 | Chen | G06Q 20/0655 |
| 2019/0026821 A1* | 1/2019 | Bathen | G06Q 40/00 |
| 2019/0043048 A1* | 2/2019 | Wright | H04L 9/0861 |
| 2019/0066065 A1* | 2/2019 | Wright | H04L 9/0861 |
| 2019/0068365 A1* | 2/2019 | Wright | G06Q 20/4015 |
| 2019/0130394 A1* | 5/2019 | Stollman | H04L 9/3239 |
| 2019/0207767 A1* | 7/2019 | Ahn | H04L 9/3236 |
| 2020/0005254 A1* | 1/2020 | Wright | H04L 9/3073 |
| 2021/0135854 A1* | 5/2021 | Karame | G06Q 20/3678 |
| 2021/0203481 A1* | 7/2021 | Wright | H04L 9/0643 |
| 2021/0264419 A1* | 8/2021 | Ratakonda | G06Q 20/389 |
| 2023/0297983 A1* | 9/2023 | Zhu | G06Q 20/1235 705/67 |

OTHER PUBLICATIONS

BitcoinWizard, "Bitcoin Wizard," retrieved from http://irclog.whitequark.org/bitcoin-wizards/2016-02-09, Oct. 2015, 12 pages.
Forkwarofattrition, "Understanding the Risk of BU (Bitcoin Unlimited)" Reddit, retrieved from https://www.reddit.com/r/Bitcoin/comments/5vo5wi/understanding_the_risk_of_bu_bitcoin_unlimited/, Feb. 2017, 45 pages.
He et al., "A Bitcoin Based Incentive Mechanism for Distributed P2P Applications," Medical Image Computing and Computer-Assisted Intervention, May 27, 2017, 12 pages.
Hearn, "[Announce] Whitepaper for Bitstorage—a Peer to Peer, Cloud Storage Network," Bitcoin Forum, retrieved from https://bitcointalk.org/index.php?topic=348868.0, Nov. 2013, 8 pages.
International Search Report and Written Opinion mailed Oct. 17, 2018, Patent Application No. PCT/IB2018/055237, 12 pages.
Nakamoto, "Bitcoin: A Peer-to-Peer Electronic Cash System," Bitcoin, Oct. 31, 2008, https://bitcoin.org/bitcoin.pdf, 9 pages.
Rende, "It's there a solution to the scaling problem?" Reddit, retrieved from https://www.reddit.com/r/Monero/comments/5q3fcf/its_there_a_solution_to_the_scaling_problem/, Jan. 2017, 7 pages.
Satoshi et al., "Connection Limits," Bitcoin Forum, Aug. 9, 2010, https://bitcointalk.org/index.php?topic=741.0; prev_next=prev, 2 pages.
UK Commercial Search Report mailed Nov. 17, 2017, Patent Application No. GB1711867.0 , 7 pages.
UK IPO Search Report mailed Dec. 13, 2017, Patent Application No. GB1711867.0, 4 pages.
Wikipedia, "Proof of space," Wikipedia the Free Encyclopedia, Jul. 11, 2017, https://en.wikipedia.org/w/index.php?title=Proof-of-space&oldid=790069182, 5 pages.

* cited by examiner

COMPUTER-IMPLEMENTED SYSTEM AND METHOD ENABLING SECURE STORAGE OF A LARGE BLOCKCHAIN OVER A PLURALITY OF STORAGE NODES

FIELD OF INVENTION

This specification relates generally to computer-implemented methods and systems suitable for implementation in nodes of a blockchain network. Modified blockchain node structures, network architectures, and protocols for handling large numbers of transactions and large transaction blocks are described. The invention is particularly suited, but not limited, to use with the Bitcoin blockchain.

BACKGROUND OF INVENTION

In this document we use the term 'blockchain' to include all forms of electronic, computer-based, distributed ledgers. These include, but are not limited to blockchain and transaction-chain technologies, permissioned and un-permissioned ledgers, shared ledgers and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions and other information. In the case of Bitcoin, each transaction is a data structure that encodes the transfer of control of a digital asset between participants in the blockchain system, and includes at least one input and at least one output. Each block contains a hash of the previous block to that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Some network nodes act as miners and perform work to ensure that each transaction is valid, with invalid transactions rejected from the network. For example, software clients installed on the nodes perform this validation work on transactions that reference unspent transaction outputs (UTXO). Validation may be performed by executing its locking and unlocking scripts. If execution of the locking and unlocking scripts evaluate to TRUE and, if certain other conditions are met, the transaction is valid and the transaction may be written to the blockchain. Thus, in order for a transaction to be written to the blockchain, it must be i) validated by a node that receives the transaction-if the transaction is validated, the node relays it to the other nodes in the network; and ii) added to a new block built by a miner; and iii) mined, i.e. added to the public ledger of past transactions. The transaction is considered to be confirmed when a sufficient number of blocks are added to the blockchain to make the transaction practically irreversible.

Although blockchain technology is most widely known for the use of cryptocurrency implementation, digital entrepreneurs have begun exploring the use of both the cryptographic security system Bitcoin is based on and the data that can be stored on the blockchain to implement new systems. It would be highly advantageous if the blockchain could be used for automated tasks and processes which are not purely limited to payments denominated in cryptocurrency. Such solutions would be able to harness the benefits of the blockchain (e.g. a permanent, tamper proof record of events, distributed processing etc.) while being more versatile in their applications.

One area of research is the use of the blockchain for the implementation of "smart contracts". These are computer programs designed to automate the execution of the terms of a machine-readable contract or agreement. Unlike a traditional contract which would be written in natural language, a smart contract is a machine executable program which comprises rules that can process inputs in order to produce results, which can then cause actions to be performed dependent upon those results.

Another area of blockchain-related interest is the use of 'tokens' (or 'coloured coins') to represent and transfer real-world entities via the blockchain. A potentially sensitive or secret item can be represented by the token which has no discernible meaning or value. The token thus serves as an identifier that allows the real-world item to be referenced from the blockchain.

SUMMARY OF INVENTION

One of the key elements to measure the health of a blockchain based cryptocurrency is the number of nodes actually storing the blockchain. The blockchain grows according to the number of transactions per second. But as a cryptocurrency becomes popular, the number of payments per second increases, and the blockchain growth rate also increases. The storage cost then becomes prohibitively high.

One technical problem is thus how to re-configure a blockchain network such that it is adapted to store a very large blockchain. A further technical problem, is how to achieve this without requiring all nodes on the blockchain network to store such a very large blockchain. Yet a further technical problem is how to re-configure a blockchain network such that specialized storage nodes can prove that they are storing at least a portion of such a very large blockchain. And yet a further technical problem is how to re-configure a blockchain network such that specialized storage nodes are incentivised to store at least a portion of such a very large blockchain.

It is an aim of the present invention to address these technical problems by providing technical solutions as described herein. In particular, this specification describes a protocol which: (i) allows storage nodes to be rewarded for maintaining a public blockchain; and (ii) verifies the integrity of the blockchain with the help of a Proof-of-Blockchain Storage (PoBS) scheme. The protocol provides a way to cryptographically check if a data file stored on a remote server is intact using a challenge-response method. The protocol is secured against a man-in-the-middle attack. A malicious peer cannot pass the challenge to a third party which is storing the data and give back the response. The scheme is also publicly verifiable.

Embodiments of the present invention can be provided in a variety of forms. For example, a computer readable storage medium can be provided which comprising computer-executable instructions which, when executed, configure one or more processors to perform the method as described herein. An electronic device can also be provided which comprises: an interface device; one or more processor(s) coupled to the interface device; and a memory coupled to the one or more processor(s), the memory having stored thereon computer executable instructions which, when executed, configure the one or more processor(s) to perform the method as described herein. Further still, a node of a blockchain network can be provided, the node configured to perform the method as described herein.

BRIEF DESCRIPTION OF THE DRAWINGS

These and other aspects of the present invention will be apparent from and elucidated with reference to, the embodiments described herein. Embodiments of the present invention will now be described, by way of example only, and with reference to the accompany drawings, in which.

DETAILED DESCRIPTION

Figure 1:
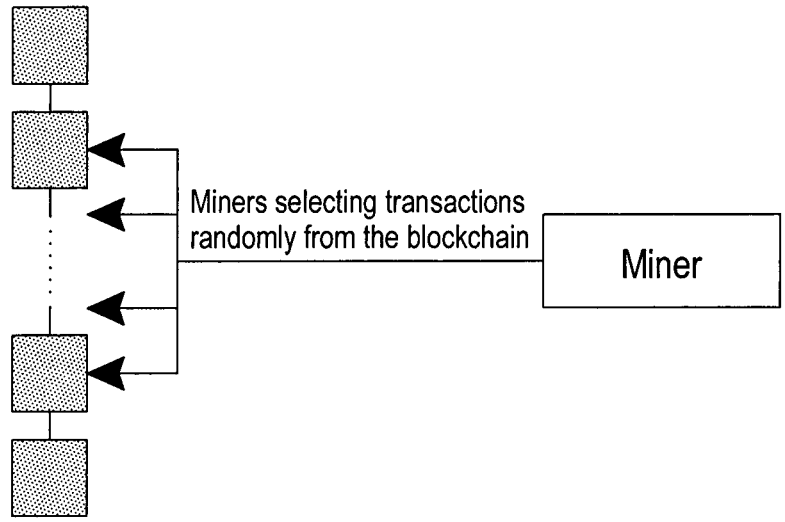
FIG. 1 shows a diagram illustrating step 1 of a proof-of-blockchain storage (PoBS) protocol.

As described in the summary of invention section, the blockchain grows according to the number of transactions per second. But as a cryptocurrency becomes popular, the number of payments per second increases, and the blockchain growth rate also increases. The storage cost then becomes prohibitively high.

We describe a protocol which: (i) allows storage nodes to be rewarded for maintaining a public blockchain; and (ii) verifies the integrity of the blockchain with the help of a Proof-of-Blockchain Storage (PoBS). The protocol provides a way to cryptographically check if a data file stored on a remote server is intact using a challenge-response method. The protocol is secured against a man-in-the-middle attack. A malicious peer cannot pass the challenge to a third party which is storing the data and give back the response. The scheme is also publicly verifiable.

A system 100 is provided, run (for example) by the miners, where (for example) every minute each miner 102 samples transactions randomly from the blockchain 104 (the miners are not necessarily synchronized). See FIG. 1.

A computer-implemented method for a node of a blockchain network is provided, the computer-implemented method comprising:
  selecting one or more transactions from a blockchain for which proof of storage is to be challenged, the selected one or more transactions having a transaction depth;
  creating a proof of blockchain storage transaction which indicates the one or more selected blockchain transactions for which proof of storage is to be challenged and a proof of blockchain storage reward which can be unlocked by a storage node that stores the one or more selected transactions; and
  sending the proof of blockchain storage transaction to one or more storage nodes on the blockchain network.

This method provides a means by which miners 202 on the blockchain network 200 can challenge storage nodes 204, 206, 208 on the blockchain network 200 to prove that they are storing the blockchain or at least a portion thereof. See FIG. 2.

The one or more selected blockchain transactions have a transaction depth d which corresponds to a depth of the one or more transactions in the blockchain, and the proof of blockchain storage reward can be set according to the transaction depth d such that the larger the transaction depth d the greater the reward.

This feature encourages storage nodes to store more of the blockchain as they will receive a larger reward for storing deeper transactions.

The one or more blockchain transactions can be selected from the blockchain at random. A list of blockchain transactions may be selected. Introducing a random selection aids in increasing the security of the system. Security is further improved by ensuring that the one or more transactions are selected from one or more blocks which have received a plurality of confirmations on the blockchain.

The proof of blockchain storage transaction can include data associated with a newly mined block which is to be stored on the blockchain. The data associated with the newly mined block can, for example, be block header data of the newly mined block. As such, a miner can challenge a storage node on the blockchain at the time they have a newly mined block ready for storage on the storage node, the challenge being associated with the newly mined block to be stored.

The data associated with a newly mined block can be combined with data associated with the one or more blockchain transactions selected from the blockchain. For example, the data associated with the newly mined block can be combined with the data associated with the one or more blockchain transactions selected from the blockchain by an XOR operation or concatenation. Furthermore, the proof of blockchain storage transaction can include one of:
  a cryptographic function of data associated with the one or more selected blockchain transactions;
  a cryptographic function of data associated with a newly mined block combined with data associated with the one or more selected blockchain transactions.

Such features set up a cryptographic function which can be calculated by storage nodes in possession of the one or more selected blockchain transactions in order to unlock the reward.

The proof of blockchain storage transaction also includes one or more blockchain network addresses associated with the one or more storage nodes on the blockchain network. These addresses can be certified blockchain network addresses, certification being achieved via a private key share scheme in order to increase the security of the system (as described in more detail later).

The method can further comprise generating a challenge prefix which includes identification numbers for the one or more selected blockchain transactions and the challenge prefix and the proof of blockchain storage transaction can be sent to the one or more storage nodes on the blockchain network. The challenge prefix can be used by the one or more storage nodes to identify and extract the one or more selected blockchain transactions from their copy of the blockchain. To further increase the security of the system, a random oracle can be used to generate the challenge prefix and one of: a cryptographic function of data associated with the one or more selected blockchain transactions; a cryptographic function of data associated with a newly mined block combined with data associated with the one or more selected blockchain transactions. The challenge prefix can also be accompanied with a digital signature for integrity and authentication or a challenge prefix message may be sent to the storage nodes in a non-transaction field.

Upon receipt of the proof of blockchain storage transaction, the one or more storage nodes can access the one or more selected blockchain transactions stored on their node and use the one or more selected blockchain transactions to unlocked the reward. For example, following the previously described example, the reward can be unlocked by calculating one of:
- a cryptographic function of data associated with the one or more selected blockchain transactions;
- a cryptographic function of data associated with a newly mined block combined with data associated with the one or more selected blockchain transactions.

A computer readable storage medium comprising computer-executable instructions may be provided which, when executed, configure one or more processors to perform the method as described herein.

An electronic device may also be provided which comprises:
- an interface device;
- one or more processor(s) coupled to the interface device;
- a memory coupled to the one or more processor(s), the memory having stored thereon computer executable instructions which, when executed, configure the one or more processor(s) to perform the method as described herein.

Further still, a node of a blockchain network can be provided, the node configured to perform the method as described herein.

An example of a proof of blockchain storage protocol will now be described. In this

Figure 2:
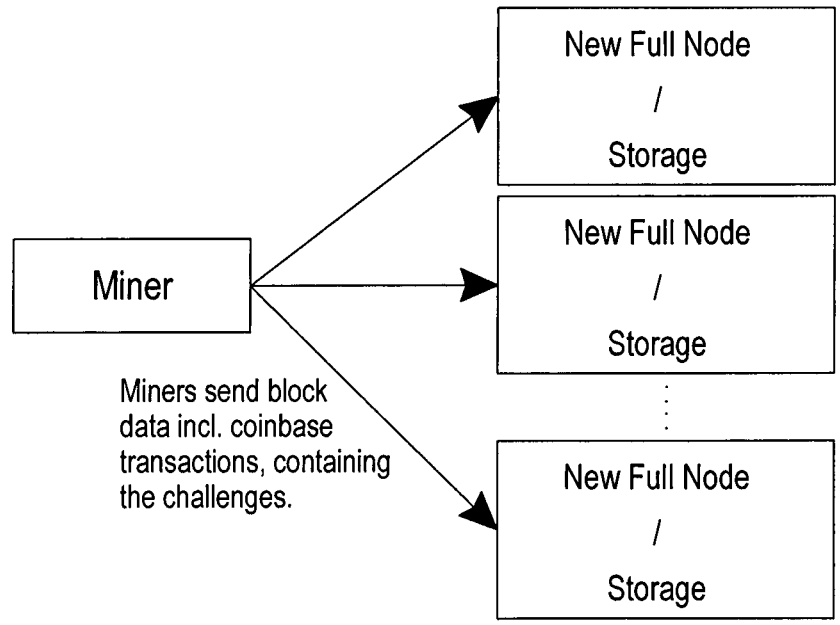
FIG. 2 shows a diagram illustrating step 3 in a proof-of-blockchain storage (PoBS) protocol.

section, we write to represent an element x being sampled at random from a set X. We sometimes write y:=A(x) to denote the deterministic result of running an algorithm A on input x. String concatenations is represented by vertical bars ($\|$) The XOR operation is represented by the symbol ($\oplus$). The set of blockchain transactions is denoted by the symbol B.
Protocol Run by Each Miner:
1. At time T, a set of randomly chosen transactions is picked from the blockchain (FIG. 1). A list of transaction is stored locally (GenList functionality)
2. Upon the successful mining of a new block, the successful miner creates a (many) challenge(s) (GenChal functionality). The challenge revenue(s) is (are) calculated: $R:=GetRew(d)$, where d is the transaction depth
3. The miner broadcasts the newly mined block data containing the coinbase transaction which includes the challenge(s) associated with the proof of storage (FIG. 2).

We now define the functionalities used in the PoBS construction.

PrePROCESSING: Set the PoBS reward function Rew which operates on the transaction depth d. The deeper the transaction T is in the blockchain, the higher is the PoBS reward.
GetReward Functionality:
Let Rew be a reward function. Upon receiving the depth d
GetReward(d):
1. Return Rew(d)
GenList Functionality:
Let nt the total number of transactions requested. Upon interrogating the blockchain B, a list L is created
GenList(n):

| 1. | $i=0$ |
| 2. | while $i < n$ |
| 3. | $T \xleftarrow{\mathcal{R}} B$ |
| 4. | if $T \notin L$: $L \leftarrow T$, i++ |
| 5. | Return L |

SETUP: Given a miner M that holds (i) the block header Head of the newly mined and (ii) a list of confirmed transactions L, M generates a challenge Chal that, among other things, indicates a specific transaction $T \in L$ for which M wants a proof of possession. The transaction is recorded in a block that received multiple confirmations.
GenChal Functionality:
As previously defined, let Head be the block header, let L be a list of confirmed transactions and let H be a cryptographic hash function. Let d be the transaction's depth (the number of blocks or confirmations after it). The GenChal (Head, L) functionality is defined as below:
GenChal (Head, L):

| 1. | Choose random $T \xleftarrow{\mathcal{R}} L$ |
| 2. | Chal := H(Head $\|$ T) or Chal := H(Head $\oplus$ T) or ... |
| 3. | $R := GetRew(d)$ |
| 4. | Return (Chal,$R) |

Figure 3:
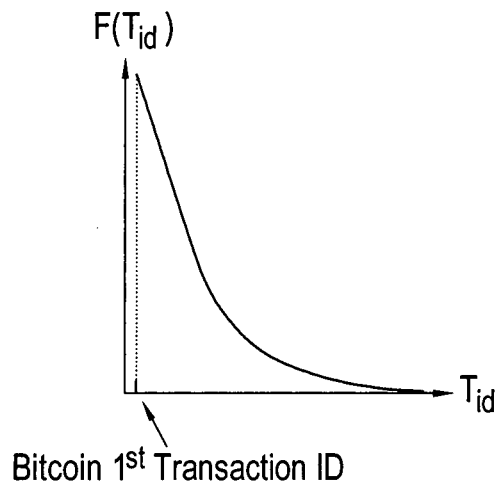
FIG. 3 shows a distribution function f(T) in the form of a bell-shaped curve.

It will be noted that in the above we did not indicate the shape of the distribution function $f(T)$. The function may be uniform or follow a bell-shaped curve (see curve 300 in FIG. 3).

Figure 4:
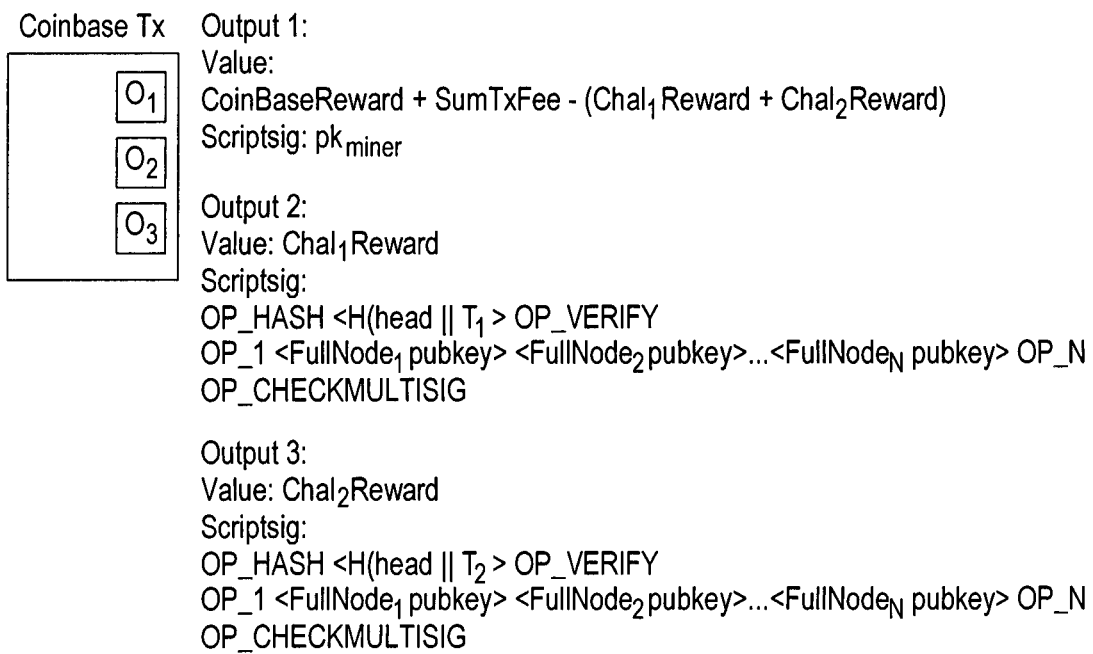
FIG. 4 shows an example of a transaction used in a proof-of-blockchain storage (PoBS) protocol.

PREPARE COINBASE TX: M completes the coinbase transaction using Chal and the storage node recipient bitcoin addresses. For illustrative purposes, a simple example of Coinbase Tx 400 is given in FIG. 4.

CHALLENGE: M generates the challenge prefix pref=$T_{id}$ which includes the transaction identification number(s). The message may be (i) accompanied with a digital signature for integrity and authentication or (ii) may be included in a non-transactional field, for example after an OP_RETURN. M sends pref and chal to the storage nodes S. Upon receiving Chal, the server computes H (Head$\|$T) which allows him/her to unlock the fund.

Figure 5:
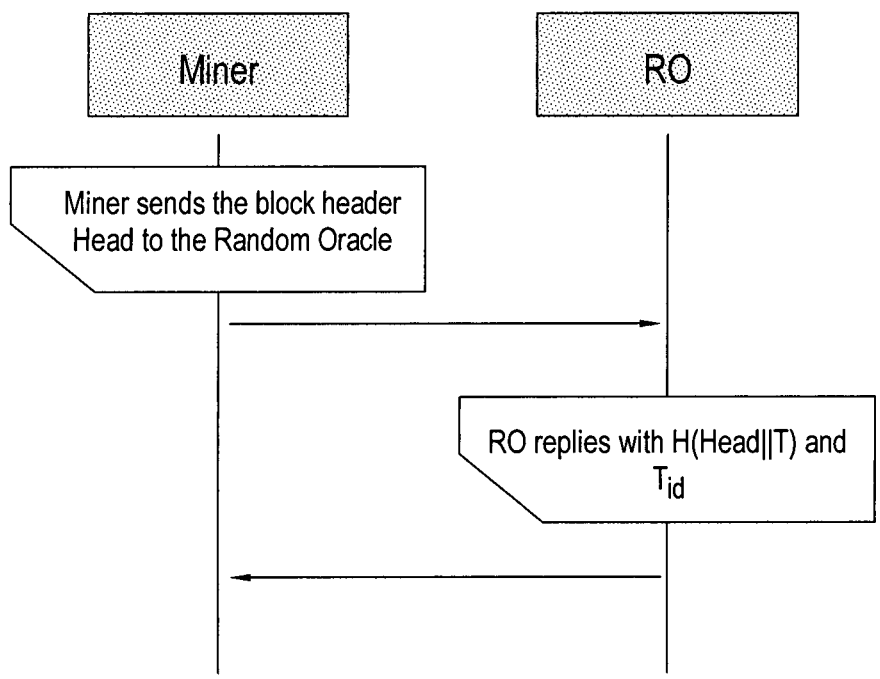
FIG. 5 shows the use of a random oracle in a proof-of-blockchain storage (PoBS) protocol.

The technique describes above can also benefit from adding a random oracle to the protocol. A random oracle is an oracle that responds to every query with a randomly chosen response (representing an honest party). In this scenario 500, the miner M 502 queries the random oracle (RO) 504 on the block header Head 506. Upon receiving Head 506, RO responds to every query with a truly random response H (Head$\|$T) 508, pref=$T_{id}$ (see FIG. 5).
Certified Bitcoin Addresses We also propose to use certified bitcoin addresses to prevent collusion between a miner and storage node for security purposes. In this regard, one of the challenges in a decentralized peer-to-peer system is ensuring that a node can communicate with another node in the network on a trusted basis. As the network architecture of some implementations evolves some nodes may take on more specialized tasks, and other nodes may rely on those specialized nodes as sources of certain data or as performers of certain functions (as described previously). If a node is going to rely on another node for information or as a legitimate source, it needs to be able to establish a trusted relationship for communicating with that node. In the case where nodes may have different roles, it would be advantageous to have a mechanism for determining and verifying a node's role. Moreover, if a node turns out to be illegitimate or malicious, it should be possible for other nodes to remember it so as to ignore future communications from such a node. In a peer-to-peer system, the challenge is to solve these problems without compromising the peer-to-peer nature of the system by imposing a central authority.

Methods and devices can thus be provided that manage the secure distribution of credentials from a group of autonomous specialized nodes to a requesting node. The secure distribution of credentials may use secret share and a group private key that none of the nodes reconstructs or possesses. The credentials include an identifier for the requesting node and a secret point that the node assembles from portions of the secret point provided by each of a plurality of the specialized nodes, where the secret point is based on the group private key and a map-to-point hash of the requesting node's identifier. The nodes may be blockchain nodes in some implementations.

Two nodes can authenticate each other as credentialed by a group of autonomous specialized nodes, without involving the group or involving a centralized certificate manager or authenticator. The method may involve a first node and a second node using bilinear pairing operations involving their respective identifiers and secret points to derive the same key. Provided the secret points and identifiers were obtained from the group using the group private key the bilinear pairing operation leads to generation of the same key at each of the two nodes, thereby authenticating their respective credentials and enabling trusted communications between the two nodes.

A node can obtain a credential from a group of specialized nodes, each of the specialized nodes having a private key share of a group private key. The method may include sending a request, from the node to a plurality of the specialized nodes, for the credential, wherein the node has an identifier; receiving, from each node in the plurality of the specialized nodes, a portion of a secret point generated by that node from the identifier and that node's private key share; and generating the secret point by combining the received portions of the secret point, and wherein the secret point is the group private key times a map-to-point hash of the identifier, and the credential is the identifier and the secret point. None of the specialized nodes nor the node may be required to obtain a complete copy of the group private key.

In some implementations, sending the request may include sending a separate request to each of the plurality of the specialized nodes. The identifier may include an identifier string identifying the node and a role string identifying the role of the group of specialized nodes.

In some cases, the identifier further includes an expiration time for the credential, and in some further cases sending a request includes sending the identifier string, and wherein receiving includes receiving the identifier.

In some implementations, generating the secret point involves combining the received portions of the secret point. Combining may include summing in some example implementations.

In some implementations, the secret point is generated using secret share and is based on the group private key. In some of those cases, secret share uses Lagrange interpolation and the private key shares of the plurality of the specialized nodes without reconstructing the group private key.

A computer-implemented method can also be provided for a first node to establish a trusted communication with a second node, the second node having a second node identifier and a second secret point, the second secret point being a group private key times a map-to-point hash of the second node identifier, the group private key being associated with a group of nodes configured to grant credentials. The method may include obtaining a first secret point from the group of nodes, wherein the first secret point is the group private key times a map-to-point hash of a first node identifier; sending the first node identifier to the second node; receiving the second node identifier; generating a first session key using a bilinear pairing operation with a map-to-point hash of the second node identifier and with the first secret point; and confirming that the first session key matches a second session key generated by the second node using the bilinear pairing operation with the second secret point and with a map-to-point hash of the first node identifier.

In some implementations, the bilinear pairing operation operation to generate first session key may be characterized by one of the expressions:

$$K_A = e(H_1(id_B), s_A), \text{ and}$$

$$K_A = e(s_B, H_1(id_A)),$$

and the bilinear pairing operation to generate the second session key is characterized by the other of the expressions, and in which $e(\ )$ is the bilinear pairing operation, $H_1(\ )$ is the map-to-point hash, $id_A$ and $id_B$ are each one of the first node identifier and the second node identifier, and $s_A$ and $s_B$ are each one of the first secret point and the second secret point.

In some implementations, obtaining the first secret point includes obtaining, from each of a plurality of nodes in the group of nodes, respective portions of the first secret point and combining the respective portions to form the first secret point without reconstructing the group private key.

In some implementations, confirming includes sending a challenge from the first node to the second node encrypted with the first session key, receiving a response to the challenge, and, based on the response, determining that the second node validly decrypted the challenge using the second session key.

In some implementations, sending further includes sending a first nonce, and wherein receiving further includes receiving a second nonce and a calculated $C_0$ value, wherein the $C_0$ value comprises a hash of a concatenation of the second session key, the first nonce, and the second nonce. In some of those cases, the concatenation further includes the first node identifier and the second node identifier. In some of those cases, generating includes generating a calculated $C_1$ value that comprises the hash of a concatenation of the first session key, the first nonce, and the second nonce, and wherein confirming comprises confirming that the calculated $C_0$ value matches the calculated $C_1$ value.

In some implementations, the second secret point is the group private key times the map-to-point hash of the second node identifier.

In some implementations, the first secret point and the second secret point are each provided by the group of nodes to the first node and second node, respectively, using secret sharing.

For example, each node in a group of nodes can include a share $k_i$ of a private key k. Secret sharing is used in threshold cryptosystems where a secret k is divided among n players, such that at least t+1 participants are required to collaborate in order to reconstruct k. The knowledge of any t pieces of the secret k leaves the latter undetermined.

Secret sharing is based on polynomial interpolation and the secret is assumed to be an element of a finite field F. The scheme comprises a dealer (dealerless versions also exist), a set of n participants $U_1, \ldots, U_n$. In the protocol, an arbitrary random secret is stored as $f(0)$ in a t degree polynomial $f(x)$ and only node i can calculate its share $f(x_i)$. If t+1 out of n nodes collaborate, they can reconstruct any point on $f(x)$, with their shares (of the key k) $k_1, k_2, \ldots, k_n$ which correspond to $f(x_1), f(x_2), \ldots, f(x_n)$ using Lagrange Polynomial Interpolation. Lagrange Polynomial Interpolation provides that a function $f(x)$ with degree t can be reconstructed with t+1 points $$p = \{(x_1, f(x_1)), (x_2, f(x_2)), \ldots, (x_{t+1}, f(x_{t+1}))\}$$

$$f(x) = \sum_{i \in p} f(x_i) \prod_{j \in p, j \neq i} \frac{x - x_j}{x_i - x_j} = \sum_{i \in p} f(x_i) b_{i,p}(x)$$

where $$b_{i,p}(x) = \prod_{j \in p, j \neq i} \frac{x - x_j}{x_i - x_j}$$

Note that: $b_{i,p}(x_i)=1$ and $b_{i,p}(x_j)=0$. In this respect, $b_i$ are interpolation coefficients.

In an implementation involving dealerless shares distribution:
1. Each node i is assigned $x_i$ which is known by everyone. Each $x_i$ has to be unique.
2. Each node i generates a random polynomial $f_i(x)$ with degree t.
3. Each node i secretly sends (encrypted with the recipients' public key) every other node their respective point on the polynomial, $f_i(x_j)$ mod n.
4. Each node i sums all their received $f_1(x_i), f_2(x_i), \ldots f_p(x_i)$, all mod n, (wherein n is the characteristic of the base field $\mathbb{F}_n$ ($\mathbb{F}_n$ can also denoted GF(n), $\mathbb{Z}/n\mathbb{Z}$)) to form $k_i=f(x_i)$ mod n which is a share on the polynomial $f(x)$ mod n.

The nodes of the group of nodes collaborate to generate a secret point $s_A$ for a requesting node. The secret point $s_A$ is in the cyclic group $G_1$, the significance of which will become clear from the explanation below regarding handshakes and pairing. The secret point is related to the identifier as:

$$s_A = k \cdot H_1(id_A)$$

where $id_A$ is the identifier for the requesting node 504. The credential may be considered to be $(id_A, s_A)$ in some implementations. $H_1$ is a map-to-point hash function, as will be explained in greater detail below.

In order to generate the secret point without reconstructing the group private key k, the group of nodes collaborate in generating $s_A$ using a form of Secret Share Joining. The requesting node sends a credential request to at least t+1 nodes of the group of nodes. Those nodes each provide the requesting node with a portion of $s_A$. In particular, each share $s_{Ai}$ of the secret point $s_A$ is determined by node i and sent to the requesting node, and the requesting node then assembles them (i.e. combines them) into the secret point $s_A$. In some examples, the shares $s_{Ai}$ are combined by summing them to obtain the secret point $s_A$.

One example process for group-based distributed generation of credentials is now described. The process is carried out by a requesting node. It begins with the requesting node setting an index i to 1. The requesting node then requests credentials from a node i.

The node i is a specialized node in a group of nodes configured to carry out an implementation of the credential granting procedure described herein. The node i determines, using portion of the group private key share $k_i$, an $i^{th}$ portion of the secret point $s_A$. That portion may be referenced as $s_{Ai}$.

The requesting node receives the portion $s_{Ai}$ from the $i^{th}$ node, i.e. it receives a partial credential. The receiving node assesses whether index i is t+1. If so, then the receiving node has received t+1 partial credentials, but if not, then it still requires additional partial credentials to reconstruct the secret point $s_A$. If i is not yet equal to t+1, then it is incremented by 1 and the process returns to request a further partial credential from the another node in the group of nodes. If i is equal to t+1, then in operation 712 the requesting node assembles the secret point $s_A$.

Having obtained credentials through the collaborative efforts of the nodes in the group of nodes, it would be advantageous to have a mechanism to check or validate credentials without relying on central authority or going back to the group for validation/authentication. In that way, two nodes that purport to have valid credentials from the same group of nodes can validate each other's credentials without the burden of time delay and communication overhead associated with having the group of nodes collaboratively verifying and validating the issued credentials.

As an overview, consider that the group private key k is a member of a finite field, i.e. $k \in \mathbb{Z}_q$. A requesting node that obtains credentials has them in the form of its identifier, $id_A$, and the secret point $s_A$ in a cyclic group $G_1$ In this example embodiment the identifier (or "pseudonym") $id_A$ is (Alice‖role‖expiration time) where ‖ denotes concatenation of two strings, and role is a string or other alphanumeric identifier associated with the group of nodes and/or its function or role. The requesting node can reveal its identifier to anyone but keeps $s_A$ secret.

Another requesting node obtains the identifier $id_B$ as (Bob‖role‖expiration time) and secret point $s_B$.

Note that the secret point $s_A$ is given by $s_A = k \cdot H_1(id_A)$ and secret point $s_B$ is given by $s_B = k \cdot H_1(id_B)$.

When Alice and Bob wish to establish trusted communications with each other, i.e. one or both of them wishes to verify the credentials of the other, the two nodes exchange their respective identifiers/pseudonyms without disclosing their secret points.

The node Alice then generates a session key $K_A$ by computing:

$$K_A = e(H_1(Bob\|role\|expiration\ time), s_A)$$

where e( ) is a bilinear map, i.e. a pairing operation, and node Bob calculates a session key $K_B$ by computing:

$$K_B = e(s_B, H_1(Alice\|role\|expiration\ time))$$

The operation $H_1(\ )$ is a map-to-point function, as will be described further below. Due to the properties of pairings, the two keys are the same, i.e. $K_A=K_B$ By sending a challenge value and getting a response for it, the two nodes can verify that the protocol succeeded, i.e. that the two nodes each hold credentials issued by the same group of nodes indicating the same role. Alternatively, one party can send to the other some content, which will be successfully decrypted if and only if the handshake succeeded.

The pairing operation in this example relies on $s_A$ and $s_B$ being from the same cyclic group $G_1$ in this case. In other cases, the two may be from different cyclic groups G1 and G2 that are related as two abelian groups that take values in another abelian group as:

$$e:G_1\times G_2\to G_T$$

where $G_1$, $G_2$, and $G_T$ are cyclic groups of the same order.

There are certain parameters in the generation of the credentials that are public. They may be generated by any node in the process and shared with the other nodes. Starting from the assumption that E is an elliptic curve containing n points over a field $\mathbb{F} q$, where q is a power of a prime relatively prime to 2 and 3, the public parameters may include the following:

$$\text{params}=(p,G_1,G_2,G_T,g_1,g_2,e,H_1,H_2)$$

where $g_1$ (resp. $g_2$) is a generator of the group $G_1$ (resp. $G_2$) of prime order P that has a bilinear map $e(.,.)$. $G_1$ is a cyclic subgroup of $E(\mathbb{F} q)$ of order r with r, q coprime. And, $e(g_1,g_2)$ generates $G_T$ which also has order p. $H_1$ and $H_2$ are map-to-point hashes with respect to $G_1$ and $G_2$, respectively. As noted above, in some implementations, and in many of the examples described herein, only $G_1$ might be used, meaning the same map-to-point hash function, $H_1$, is used for both secret points $s_A$ and $s_B$.

In some elliptic curve cryptosystems, a hash algorithm is used to map a password or other string, which is an element of a finite field, into a point of a given elliptic curve These are map-to-point hashes. More precisely, a map-to-point hash function $H_1$ is a transformation that takes an input a message m and returns a point $P\in E(K)$. More particularly, $H_1$ returns the point $P\in E(K)[r]$, where $E(K)[r]$ is the subgroup of $E(K)$ generated by $G_1$. In this scheme, there exists a one-to-one mapping $f$ from a base field $\mathbb{F} q$ to the curve. This enables to hash using $f(H(m))$ where H is a classical hash function and $H(m)\in \mathbb{F} q$ The message flow between two nodes, A and B in establishing a trusted communication channel by validating each others' credentials is now described. In this example implementation, node A provides its identifier $id_A$ to node B. The identifier $id_A$ is publicly available and may be obtained by node B from another source in some cases. From this, node B is able to generate a session key $K_B$ using the identifier for node A, the secret point $s_B$ held by node B, and the map-to-point hash function $H_1$ prescribed by the group-of-nodes that issued the credentials. The session key $K_B$ is generated using the pairing operation $e(\ )$ that is also prescribed by the group of nodes:

$$K_B=e(s_B,H_1(\text{Alice}\|\text{role}\|\text{expiration time}))$$

where, in this example, node B's identifier $id_B$ is (Alice∥role∥expiration time)

Node B provides its identifier $id_B$ to node A, and node A is then able to similarly generate a session key $K_A$ using node B's identifier, its secret point $s_A$, and same the pairing operation and map-to-hash function:

$$K_A=e(H_1(\text{Bob}\|\text{role}\|\text{expiration time}),s_A)$$

If the secret points were legitimately collaboratively generated by the group of nodes using the same group private key k and the identifiers of the respective nodes A and B, then the pairing operations should result in $K_A=K_B$. This may be testing in any number of ways. In this example implementation, node A sends a challenge to node B encrypted with session key $K_A$. Node B attempts to decrypt the challenge using its session key $K_B$ and sends a response to the challenge. The response may be encrypted by session key $K_B$. On this basis both nodes can be sure that they have the same session key. That session key may be used to encrypt communications between the two nodes. In another implementation the session key may be used to encrypt communications leading to set up of another key. In yet another implementation, communications between the two nodes simply rely on the above-described procedure to validate/authenticate each others' credentials, and communications between the two nodes are either not encrypted or are encrypted using the nodes' usual public-private key pairs.

Another example implementation is now described. In this example, node A begins by generating a random nonce, $\text{nonce}_A$. It sends its identifier $id_A$ and its nonce to node B. Node B generates its own nonce, $\text{nonce}_B$. Node B then, in this example, generates the value $C_0$, which is a hash of the result of the pairing operation and other data, including the nonces. In this example, the value $C_0$ may be given by:

$$C_0=H(e(s_B,H_1(id_A))\|id_A\|id_B\|\text{nonce}_A\|\text{nonce}_B)$$

where H is a collision resistant hash function from strings to strings. In one example, H is SHA-256.

Node B then replies to node A providing its identifier $id_B$, its nonce $\text{nonce}_B$ and the value $C_0$. Node A then performs a similar calculation to obtain the value $C_1$, which in this example is expressed as:

$$C_1=H(e(H_1(id_B),s_A)\|id_A\|id_B\|\text{nonce}_A\|\text{nonce}_B)$$

It will be noted that the only difference in the arguments in the expression for $C_1$ versus $C_0$ is in the pairing operation. Accordingly, if the bilinear pairing operation confirms that the credentials of node A and node B were obtained from the same group of nodes, then the two values should match. Node A can verify that they match and, if so, sends $C_1$ to node B, which also verifies that they match. In one implementation, the values $C_0=C_1$ are then used as the session key to encrypt communications between node A and node B. In some implementations, the nodes simply rely on their usual public key-private key pairs to encrypt communications, and the above-described operations are for authentication and not also for establishing a session key.

In some example implementations, the data or strings concatenated and hashed to form the values $C_0$ and $C_1$ may include other data or strings or may exclude some of the above example strings. For example, in one implementation the values $C_0$ and $C_1$ may not include concatenation of the identifiers $id_A$ and $id_B$. Although it will be appreciated that the hashes and nonces help protect the communication from man-in-the-middle attacks.

It should be noted that the above-mentioned embodiments illustrate rather than limit the invention, and that those skilled in the art will be capable of designing many alternative embodiments without departing from the scope of the invention as defined by the appended claims. For example, it is to be understood that while transactions may transfer Bitcoins, users may instead exchange other resources using the methods and systems described herein, such as information, contracts, and tokens. A token represents an asset or resource according to a smart contract associated with the token, such that control of the token affords control of the asset or resource. The smart contract itself may be stored off-blockchain, or it may be stored inside one or more transactions.

In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method for a node of a blockchain network, the computer-implemented method comprising:
   selecting one or more blockchain transactions from a blockchain for which proof of storage is challenged, the selected one or more block chain transactions indicative of a transaction depth d, wherein the transaction depth is a number of blocks or confirmations after the selected transaction, and wherein the one or more block chain transactions are selected from one or more blocks that received a plurality of confirmations on the blockchain;
   creating a proof of blockchain storage transaction including:
   an indication of the one or more selected blockchain transactions for which proof of storage is to be challenged, data associated with a newly mined block which is stored on the blockchain, and a proof of blockchain storage reward which can be unlocked by a storage node that stores the one or more selected blockchain transactions, wherein the proof of blockchain storage reward is set according to the transaction depth d, wherein a larger the transaction depth d corresponds to a greater proof of blockchain storage reward, the proof of blockchain storage reward unlockable by calculating a cryptographic function of data associated with the one or more selected blockchain transactions and based on a secret point of the storage node, wherein the secret point is generated using secret share among a group of nodes including a challenged node and is based on a private key of the group;
   generating a challenge prefix which includes identification numbers for the one or more selected blockchain transactions; and
   sending the challenge prefix and the proof of blockchain storage transaction to the storage node on the blockchain network.

2. The computer-implemented method according to claim 1, wherein the one or more blockchain transactions are selected from the blockchain at random.

3. The computer-implemented method according to claim 1, wherein a list of blockchain transactions is selected from the blockchain.

4. The computer-implemented method according to claim 1, wherein the data associated with the newly mined block is block header data of the newly mined block.

5. The computer-implemented method according to claim 1, wherein the data associated with a newly mined block is combined with data associated with the one or more blockchain transactions selected from the blockchain.

6. The computer-implemented method according to claim 5, wherein the data associated with the newly mined block is combined with the data associated with the one or more blockchain transactions selected from the blockchain by an XOR operation or concatenation.

7. The computer-implemented method according to claim 1, wherein the proof of blockchain storage transaction includes one of:
   the cryptographic function of the data associated with the one or more selected blockchain transactions; and
   the cryptographic function of the data associated with the newly mined block combined with the data associated with the one or more selected blockchain transactions.

8. The computer-implemented method according to claim 1, wherein the proof of blockchain storage transaction includes one or more blockchain network addresses associated with one or more storage nodes on the blockchain network.

9. The computer-implemented method according to claim 8, wherein the one or more blockchain network addresses associated with one or more storage nodes on the blockchain network are certified blockchain network addresses, certification being achieved via a private key share scheme.

10. The computer-implemented method according to claim 1, wherein a random oracle is used to generate the challenge prefix and a cryptographic function of data associated with the one or more selected blockchain transactions or a cryptographic function of data associated with a newly mined block combined with data associated with the one or more selected blockchain transactions.

11. The computer-implemented method according to claim 1, wherein the challenge prefix is accompanied with a digital signature for integrity and authentication or a challenge prefix message is sent in a non-transaction field.

12. The computer-implemented method according to claim 1, wherein, upon receipt of the proof of blockchain storage transaction, the one or more storage nodes access the one or more selected blockchain transactions stored on the storage node and use the one or more selected blockchain transactions to unlock the proof of blockchain storage reward.

13. The computer-implemented method according to claim 12, wherein the proof of blockchain storage reward is unlocked by calculating one of the cryptographic function of the data associated with the one or more selected blockchain transactions; and
   the cryptographic function of the data associated with a newly mined block combined with data associated with the one or more selected blockchain transactions.

14. A non-transitory computer readable storage medium comprising computer-executable instructions which, when executed, configure one or more processors to perform the method of claim 1.

15. An electronic device comprising:
   an interface device;
   one or more processor(s) coupled to the interface device; and
   a memory coupled to the one or more processor(s), the memory having stored thereon computer executable instructions which, when executed, configure the one or more processor(s) to perform the method of claim 1.

16. A node of a blockchain network, the node configured to perform the method of claim 1.

* * * * *